(12) United States Patent
Most et al.

(10) Patent No.: US 10,184,068 B2
(45) Date of Patent: Jan. 22, 2019

(54) COATING COMPOSITIONS COMPRISING SILICONE

(71) Applicant: PPG Industries Ohio, Inc., Cleveland, OH (US)

(72) Inventors: Christopher L. Most, Wilder, KY (US); Ayaz Kutubuddin, West Chester, OH (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 15/278,064

(22) Filed: Sep. 28, 2016

(65) Prior Publication Data

US 2018/0086940 A1  Mar. 29, 2018

(51) Int. Cl.
| | | |
|---|---|---|
| C09D 183/10 | (2006.01) | |
| C09D 167/00 | (2006.01) | |
| B65D 25/14 | (2006.01) | |
| C08J 7/04 | (2006.01) | |
| C09D 183/04 | (2006.01) | |
| C08G 77/12 | (2006.01) | |
| C08G 77/20 | (2006.01) | |

(52) U.S. Cl.
CPC .......... C09D 183/10 (2013.01); B65D 25/14 (2013.01); C08J 7/047 (2013.01); C09D 167/00 (2013.01); C09D 183/04 (2013.01); C08G 77/12 (2013.01); C08G 77/20 (2013.01)

(58) Field of Classification Search
CPC .......... C08G 77/12; C08G 77/20; C08L 67/02
See application file for complete search history.

(56) References Cited

U.S. PATENT DOCUMENTS

| | | | |
|---|---|---|---|
| 4,609,574 A | 9/1986 | Keryk et al. | |
| 4,766,163 A * | 8/1988 | Strudwick | C08L 67/06 523/500 |
| 4,777,087 A * | 10/1988 | Heeks | C08K 5/0091 428/321.1 |
| 6,410,134 B1 | 6/2002 | Park et al. | |
| 9,038,849 B2 | 5/2015 | Most et al. | |
| 2013/0280454 A1 | 10/2013 | Telford et al. | |
| 2016/0115279 A1 | 4/2016 | Song et al. | |
| 2017/0306150 A1 * | 10/2017 | Nishida | C08K 5/36 |

FOREIGN PATENT DOCUMENTS

| | | |
|---|---|---|
| EP | 1734093 | 12/2006 |
| JP | 2010195014 | * 1/2010 |

OTHER PUBLICATIONS

JP 2010 195014 translation (2010).*

* cited by examiner

*Primary Examiner* — Kuo Liang Peng
(74) *Attorney, Agent, or Firm* — Diane R. Meyers

(57) ABSTRACT

A coating composition comprising a silicone component is disclosed. The silicone component comprises a silicone comprising at least one silicon-bonded hydrogen and a silicone comprising at least one ethylenically unsaturated group. Articles, such as packages, coated at least in part with such coatings are also disclosed.

9 Claims, No Drawings

COATING COMPOSITIONS COMPRISING SILICONE

FIELD OF THE INVENTION

The present invention is directed to coating compositions comprising a silicone component comprising a silicone comprising at least one silicon-bonded hydrogen and a silicone comprising at least one ethylenically unsaturated group. Substrates, including packages, coated at least in part with such a coating are also within the scope of the present invention.

BACKGROUND OF THE INVENTION

The application of various polymeric coatings to metallic substrates, including metal cans such as food, beverage, and cosmetic containers, to retard or inhibit corrosion is well established. Coatings are applied to the interior of such containers to prevent the contents from contacting the metal of the container. Contact between the metal and the food, beverage, or cosmetic can lead to corrosion of the metal container, which can then contaminate the food, beverage, or cosmetic. This is particularly true when the contents of the container are acidic in nature, such as tomato-based products and soft drinks.

Certain coatings, particularly in the packaging industry, undergo extreme stresses in the course of preparation and use of the packaging containers. In addition to flexibility, packaging coatings may also need resistance to chemicals, solvents, and pasteurization processes used in the packaging of beer and other beverages, and may also need to withstand retort conditions commonly employed in food packaging. In addition to corrosion protection, coatings for food and beverage containers should be non-toxic, and should not adversely affect the taste of the food or beverage in the can or the appearance of the cosmetic in the can. Resistance to "popping", "blushing" and/or "blistering" may also be desired.

Bisphenol A ("BPA") contributes to many of the properties desired in packaging coating products. The use of BPA and related products such as bisphenol A diglycidyl ether ("BADGE"), however, has recently come under scrutiny in the packaging industry. Substantially BPA-free coatings having properties comparable to coatings comprising BPA are therefore desired.

SUMMARY OF THE INVENTION

The present invention is directed to coating compositions comprising a silicone component comprising:
 a. a silicone comprising at least one silicon-bonded hydrogen and
 b. a silicone comprising at least one ethylenically unsaturated group.
Articles, including packages, coated at least in part with such coatings are also within the scope of the present invention.

DETAILED DESCRIPTION OF THE INVENTION

The present invention is directed to coating compositions comprising a silicone component comprising a silicone comprising at least one silicon-bonded hydrogen and a silicone comprising at least one ethylenically unsaturated group. A "silicone" will be understood as generally referring to a compound having Si—O bonds.

A "silicone comprising at least one silicon-bonded hydrogen" refers to a silicone having reactive hydrogen groups pendant and/or terminal to the silicone backbone; that is, the compound has one or more Si—H bonds. A silicone comprising a silicon-bonded hydrogen according to the present invention has at least one silicon-bonded hydrogen, but can have two or more, five or more, ten or more and the like. A silicone comprising at least one silicon-bonded hydrogen according to the present invention may be prepared by equilibrating an alkyl and/or aryl group containing siloxane with a siloxane having pendent and/or terminal hydrogens, such as silicon hydrides. Examples of the alkyl/aryl group containing siloxane include octamethylcyclotetrasiloxane, octaphenylcyclotetrasiloxane, and tetramethyltetraphenylcyclotetrasiloxane. An example of a siloxane having pendent silicon hydride groups is 2,4,6,8-tetramethylcyclotetrasiloxane and examples of siloxanes having terminal silicon hydride groups include 1,1,3,3-tetramethylsiloxane, 1,1,3,3-tetraphenyldisiloxane, or any silane comprised of at least one methyl or alkyl/aryl group, an alkoxy or chlorine and a hydride. Liquid methyl hydrogen pendent compounds can also be used to introduce reactive hydrogen functionality, such as methylhydrogen fluids including those commercially available from Shin-Etsu, such as Shin-Etsu F9W9. The two siloxanes can be reacted in sufficient amounts to yield the desired molecular weight and reactive hydrogen content. The reaction can take place in the presence of a strong acid catalyst, such as sulfonic or phosphoric acid. The resulting resin can be vacuum stripped to >98% non-volatile content to remove residual cyclic structures. For example, if one mole of a polysiloxane having 10 reactive hydrogens and an Mw of 20,000 was desired, 162 grams of hexamethyldisiloxane, 600 grams of 2,4,6,8-tetramethylcyclotetrasiloxane and 19000 grams of octamethylcyclotetrasiloxane could be reacted. Mw as reported herein is the weight average molecular weight as measured by GPC using a polystyrene standard. Silicones comprising at least one silicon-bonded hydrogen are also commercially available from SilTech.

A "silicone comprising at least one ethylenically unsaturated group" refers to a silicone having one or more points of unsaturation pendent and/or terminal to the silicone backbone; that is, the compound has one or more C=C bonds. The silicone can be directly attached to the C=C bond, that is Si—C=C, or bonded to other elements in the compound. A silicone comprising an unsaturated group according to the present invention has at least one unsaturated group, but can have two or more, five or more, ten or more and the like. The unsaturation can derive from any compound that can be reacted with the silicone. Nonlimiting examples include vinyl group containing acrylamides, such as nBMA, allyl compounds, fatty acids, polyesters, acrylics and the like. A silicone comprising at least one ethylenically unsaturated group according to the present invention may be prepared by reacting an alky and/or aryl group containing siloxane with a vinyl containing siloxane. Examples of suitable vinyl containing siloxanes include 2,4,6,8-tetramethyl-2,4,6,8-tetravinylcyclotetrasiloxane, 1,3-divinyltetramethyldisiloxane, or 1,3-divinyltetraphenyldisiloxane. As with the silicone comprising at least one silicon-bonded hydrogen, the components used in forming the silicone comprising at least one ethylenically unsaturated group should be reacted in sufficient amounts to yield the desired molecular weight and vinyl content. The reaction can take place in the presence of tetramethylammonium silanolate catalyst. The resulting resin can be vacuum stripped to >98% non-volatile content to remove residual cyclic structures. For example, if one mole of a polysiloxane having 8 reactive vinyl groups and a Mw of 10,000 was desired, 162 grams of hexamethyldisiloxane, 688 grams of 2,4,6,8-tetramethyl-2,4,6,8-tetravinylcyclotetrasiloxane, and 9176 grams of octamethyltetracyclosiloxane could be reacted. Silicones comprising at least one ethylenically unsaturated groups are also commercially available from SilTech.

The Mw of the silicone comprising at least one silicon-bonded hydrogen and silicone comprising at least one ethylenically unsaturated group can be the same or different and can be chosen based on the needs of the user. In certain applications, an Mw for each of the silicones of 3000-100,000 may be desired. Higher or lower Mw may be desired for other applications.

It will be appreciated that, upon application of heat during cure of the coating composition, the silicone comprising at least one silicon-bonded hydrogen and silicone comprising at least one ethylenically unsaturated group may react in a hydrosilylation reaction. In this reaction, the reactive hydrogen of the silicone comprising at least one silicon-bonded hydrogen will add across the unsaturation of the silicone comprising at least one ethylenically unsaturated group. A compound that catalyzes this reaction, a "hydrosilylation catalyst", can therefore also be used in the composition. Suitable hydrosilylation catalysts include the Speier's catalyst, commercial available from Sigma-Aldrich. Other suitable catalysts include Karsteedt's catalyst, chiral phosphines, palladium catalysts, and UV light. If used, the catalyst may typically be present in an amount of 1 to 15 ppm. The hydrosilylation catalyst may contribute to stain resistance of the cured coating by disrupting conjugated double bonds in compounds that typically contribute to visible staining, such as carotenoids.

The ratio of silicon-bonded hydrogen groups on the silicone comprising at least one silicon-bonded hydrogen to unsaturated groups on the silicone comprising at least one ethylenically unsaturated group may vary in the composition. The ratio of silicon-bonded hydrogen to unsaturation may vary, for example, between 1.5:1 to 1:1.5, such as 1.25:1 to 1:1.25, 1.1:1 to 1:1.1, 1.05:1 to 1:1.05 or 1:1. Any endpoints within any of these ranges may be combined. For completion of the hydrosilylation reaction, a ratio close to 1:1 may be desired. It may also be desired to leave unreacted 'C=C' or 'Si—H'; that is, an excess of unsaturation or an excess of silicon-bonded hydrogen could be used. The silicon-bonded hydrogen groups or unsaturated groups could be further reacted with another component. These groups might be reacted with the film forming resin or crosslinker and in this manner become reacted into the coating film. For example, a hydrogen functional polysilicone in the presence of a hydrosilation catalyst could react during coating cure with vegetable oils such as soybean or linseed or polybutadiene to form a tightly knit uniform film. Silicon-bonded hydrogen or unsaturated groups might be reacted with other components to introduce other functionality into the coating. For example, hydrogen functional polysilicone resin could be reacted with allyl glycidyl ether or glycidyl methacrylate via hydrosilation to form an epoxide functional polysilicone. Silicon-bonded hydrogen groups may also serve to improve adhesion to metal substrates. Accordingly, the ratio of 1.5:1 to 1:1.5 or lower could be used when a substantially stoichiometric reaction is desired, but much larger ratios could be used if excess silicon-bonded hydrogen or unsaturated groups are desired in the silicone component.

The amount of silicone component in the coating composition may vary based on the needs of the user and may include 0.01 wt % or higher, such as 0.25 wt % or higher, 0.5 wt % or higher, 0.6 wt % or higher, or 0.75 wt % or higher and/or 5.0 wt % or lower, 2.5 wt % or lower, 2.0 wt % or lower, 1.5 wt % or lower, 1.25 wt % or lower, 1.1 wt % or lower or 1.0 wt % or lower. For example, the amount of silicone component may be 0.01 to 1.5 wt %, or 0.75 to 1.1 wt % or 0.5 to 1.0 wt %, with all wt % based on total solids weight. Other applications may allow for even higher amounts, such as 20 wt % or higher.

The coating compositions of the present invention may further comprise a film forming component. A film forming component may include, for example, a film forming resin and a crosslinker therefor. Any film forming resin can be used according to the present invention. The film-forming resin can comprise, for example, an acrylic polymer, a polyester polymer, a polyurethane polymer, a polyamide polymer, a polyether polymer, a polysiloxane polymer, copolymers thereof, and mixtures thereof. Generally, these polymers can be any polymers of these types made by any method known to those skilled in the art. Such polymers may be solvent-borne or water-dispersible, emulsifiable, or of limited water solubility. The film forming resin will typically have functional groups including, for example, carboxylic acid groups, amine groups, epoxide groups, hydroxyl groups, thiol groups, carbamate groups, amide groups, urea groups, isocyanate groups (including blocked isocyanate groups) mercaptan groups, and combinations thereof. Appropriate mixtures of film-forming resins may also be used in the preparation of the present compositions. The film forming component may also comprise a crosslinker having functional groups reactive with the functional groups on the resin. One skilled in the art can select an appropriate crosslinker based on this functionality from crosslinkers such as melamine, phenolic, carbodiimide, hydroxyalkylamide, hydroxyalkyurea, isocyanate, blocked isocyanate, benzoguanamine, TGIC, epoxies, oxazolines, and the like. The film forming resin may also be self-crosslinking; that is, the resin will react with itself to cure. Examples of such resins include polysiloxane resins that contain silanol (Si—OH), alkoxy groups (Si—O—R), or acetoxy groups (Si—O—COCH$_3$), which can condense or become reactive due to the presence of moisture and heat to self-condense.

The composition can comprise, for example, 10 weight percent or greater of film forming component, such as 50 weight percent or greater or 75 weight percent or greater and/or can comprise 99 weight percent or lower of film forming component, such as 80 weight percent or lower or 70 weight percent or lower, with weight percent based on total solid weight of the coating composition.

The coating composition may comprise one or more solvents including water or organic solvents. Suitable organic solvents include glycols, glycol ether alcohols, alcohols, ketones, and aromatics, such as xylene and toluene, acetates, mineral spirits, naphthas and/or mixtures thereof. "Acetates" include the glycol ether acetates. The solvent can be a non-aqueous solvent. "Non-aqueous solvent" and like terms means that less than 50% of the solvent is water. For example, less than 10%, or even less than 5% or 2%, of the solvent can be water. It will be understood that mixtures of solvents, including or excluding water in an amount of less than 50%, can constitute a "non-aqueous solvent". The composition may be aqueous or water-based. This means that 50% or more of the solvent is water. These embodiments have less than 50%, such as less than 20%, less than 10%, less than 5% or less than 2% solvent.

The composition may be in solid particulate form, i.e. a powder coating. Such coatings will be appreciated as being environmentally friendly, as only water is released on cure.

If desired, the compositions can comprise other optional materials well known in the art of formulating, such as colorants, plasticizers, abrasion resistant particles, anti-oxidants, hindered amine light stabilizers, UV light absorbers and stabilizers, surfactants, flow control agents, thixotropic agents, fillers, organic cosolvents, reactive diluents, catalysts, grind vehicles, slip agents, moisture scavenger and other customary auxiliaries.

As used herein, the term "colorant" means any substance that imparts color and/or other opacity and/or other visual effect, e.g. gloss, to the composition. The colorant can be added to the coating in any suitable form, such as discrete particles, dispersions, solutions and/or flakes. A single colorant or a mixture of two or more colorants can be used in the coatings of the present invention. Particularly suitable for packaging coatings are those approved for food contact, such as titanium dioxide; iron oxides, such as black iron oxide; carbon black; ultramarine blue; phthalocyanines, such as phthalocyanine blue and phthalocyanine green; chromium oxides, such as chromium green oxide; graphite fibrils; ferried yellow; quindo red; and combinations thereof, and those listed in Article 178.3297 of the Code of Federal Regulations, which is incorporated by reference herein.

Example colorants include matting pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by grinding or simple mixing. Colorants can be incorporated by grinding into the coating by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, carbon fiber, graphite, other conductive pigments and/or fillers and mixtures thereof. The terms "pigment" and "colored filler" can be used interchangeably.

Example dyes include, but are not limited to, those that are solvent and/or aqueous based such as acid dyes, azoic dyes, basic dyes, direct dyes, disperse dyes, reactive dyes, solvent dyes, sulfur dyes, mordant dyes, for example, bismuth vanadate, anthraquinone, perylene aluminum, quinacridone, thiazole, thiazine, azo, indigoid, nitro, nitroso, oxazine, phthalocyanine, quinoline, stilbene, and triphenyl methane.

Example tints include, but are not limited to, pigments dispersed in water-based or water-miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemicals, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm Nanoparticles can be produced by milling stock organic or inorganic pigments with grinding media having a particle size of less than 0.5 mm Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are described, for example, in U.S. Pat. No. 7,605,194 at column 3, line 56 to column 16, line 25, the cited portion of which being incorporated herein by reference.

Example special effect compositions that may be used include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. For example, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air. A photosensitive composition and/or photochromic composition, which reversibly alters its color when exposed to one or more light sources, can be used in the coating of the present invention. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. For example, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

The photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with the present invention, have minimal migration out of the coating. Example photosensitive compositions and/or photochromic compositions and methods for making them are identified in U.S. Pat. No. 8,153,344, and incorporated herein by reference.

In general, the colorant can be present in any amount sufficient to impart the desired visual and/or color effect. The colorant may comprise from 1 to 65 weight percent of the present compositions, such as from 3 to 40 weight percent or 5 to 35 weight percent, with weight percent based on the total weight of the compositions.

An "abrasion resistant particle" is one that, when used in a coating, will impart some level of abrasion resistance to the coating as compared with the same coating lacking the particles. Suitable abrasion resistant particles include organic and/or inorganic particles. Examples of suitable organic particles include but are not limited to diamond particles, such as diamond dust particles, and particles formed from carbide materials; examples of carbide particles include but are not limited to titanium carbide, silicon carbide and boron carbide. Examples of suitable inorganic particles, include but are not limited to silica; alumina; alumina silicate; silica alumina; alkali aluminosilicate; borosilicate glass; nitrides including boron nitride and silicon nitride; oxides including titanium dioxide and zinc oxide; quartz; nepheline syenite; zircon such as in the form of zirconium oxide; buddeluyite; and eudialyte. Particles of any size can be used, as can mixtures of different particles and/or different sized particles. For example, the particles can be microparticles, having an average particle size of 0.1 to 50, 0.1 to 20, 1 to 12, 1 to 10, or 3 to 6 microns, or any combination within any of these ranges. The particles can be nanoparticles, having an average particle size of less than 0.1 micron, such as 0.8 to 500, 10 to 100, or 100 to 500 nanometers, or any combination within these ranges.

Any slip agent can be used according to the present invention such as those commercial available from BYK Chemie or Dow Corning. A wax can also be used such as polyolefin wax, silicone or paraffin.

The coating compositions of the present invention, may be substantially free, may be essentially free and/or may be completely free of bisphenol A and epoxy compounds derived from bisphenol A ("BPA"), such as bisphenol A diglycidyl ether ("BADGE"). Such compounds are sometimes referred to as "BPA non intent" because BPA, including derivatives or residues thereof, are not intentionally added but may be present in trace amounts because of impurities or unavoidable contamination from the environment. The coating compositions can also be substantially free and may be essentially free and/or may be completely free of bisphenol F and epoxy compounds derived from bisphenol F, such as bisphenol F diglycidyl ether ("BFDGE"). The term "substantially free" as used in this context means the silicone component, the film forming component and/or coating compositions themselves contain less than 1000 parts per million (ppm), "essentially free" means less than 100 ppm and "completely free" means less than 20 parts per billion (ppb) of any of the above mentioned compounds, derivatives or residues thereof.

The present compositions can be applied to any substrates known in the art, for example, automotive substrates, marine substrates, industrial substrates, packaging substrates, wood flooring and furniture, apparel, electronics including housings and circuit boards and including consumer electronics such as housings for computers, notebooks, smartphones, tablets, televisions, gaming equipment, computer equipment, computer accessories, MP3 players, and the like, glass and transparencies, sports equipment including golf balls, and the like. Accordingly, the present invention is further directed to a substrate coated at least in part with any of the coating compositions described above. These substrates can be, for example, metallic or non-metallic. Metallic substrates include tin, steel, tin-plated steel, chromium passivated steel, galvanized steel, aluminum, aluminum foil. Metal sheet as used herein refers to flat metal sheet and coiled metal sheet, which is coiled, uncoiled for coating and then re-coiled for shipment to a manufacturer. Non-metallic substrates include polymeric, plastic, polyester, polyolefin, polyamide, cellulosic, polystyrene, polyacrylic, poly(ethylene naphthalate), polypropylene, polyethylene, nylon, EVOH, polylactic acid, other "green" polymeric substrates, poly(ethyleneterephthalate) ("PET"), polycarbonate, polycarbonate acrylobutadiene styrene ("PC/ABS"), polyamide, wood, veneer, wood composite, particle board, medium density fiberboard, cement, stone, glass, paper, cardboard, textiles, leather both synthetic and natural, and the like. The substrate can be one that has been already treated in some manner, such as to impart visual and/or color effect. Suitable substrates can include those in which powder coatings are typically applied.

The compositions of the present invention can be applied by any means standard in the art, such as electrocoating, spraying, electrostatic spraying, dipping, rolling, brushing, and the like.

The compositions can be applied to a dry film thickness of 0.04 mils to 4 mils, such as 0.3 to 2 or 0.7 to 1.3 mils. The compositions can also be applied to a dry film thickness of 0.1 mils or greater, 0.5 mils or greater 1.0 mils or greater, 2.0 mils or greater, 5.0 mils or greater, or even thicker. In some applications, a dry film thickness of 1-20 microns, such as 2-6 microns, is desired.

The compositions of the present invention can be used alone, or in combination with one or more other compositions, such as a coating system having two or more layers. For example, the compositions of the present invention can comprise a colorant or not and can be used as a primer, basecoat, and/or top coat. For substrates coated with multiple coatings, one or more of those coatings can be coatings as described herein. The present coatings can also be used as a packaging "size" coating, wash coat, spray coat, end coat, and the like.

It will be appreciated that the compositions described herein can be either one component ("1K"), or multi-component compositions such as two component ("2K") or more. A 1K composition will be understood as referring to a composition wherein all the coating components are maintained in the same container after manufacture, during storage, etc. A 1K composition can be applied to a substrate and cured by any conventional means, such as by heating, forced air, and the like. The present compositions can also be multi-component, which will be understood as compositions in which various components are maintained separately until just prior to application. As noted above, the present compositions can be thermoplastic or thermosetting.

The composition can be a clearcoat. A clearcoat will be understood as a coating that is substantially transparent or translucent. A clearcoat can therefore have some degree of color, provided it does not make the clearcoat opaque or otherwise affect, to any significant degree, the ability to see the underlying substrate. The clearcoats of the present invention can be used, for example, in conjunction with a pigmented basecoat. The clearcoat can be formulated as is known in the coatings art.

The composition may also comprise a colorant, such as a pigmented basecoat used in conjunction with a clearcoat, or as a pigmented monocoat. Such coating layers are used in various industries to impart a decorative and/or protective finish. For example, such a coating or coating system may be applied to a vehicle. "Vehicle" is used herein in its broadest sense and includes all types of vehicles, such as but not limited to cars, trucks, buses, vans, golf carts, motorcycles, bicycles, railroad cars, airplanes, helicopters, boats of any size and the like. It will be appreciated that the portion of the vehicle that is coated according to the present invention may vary depending on why the coating is being used. For example, anti-chip primers may be applied to some of the portions of the vehicle as described above. When used as a colored basecoat or monocoat, the present coatings will typically be applied to those portions of the vehicle that are visible such as the roof, hood, doors trunk lid and the like, but may also be applied to other areas such as inside the trunk, inside the door and the like especially when the compositions are formulated as sealants or adhesives; they can also be applied to those portions of the car that are in contact with the driver and/or passengers, such as the steering wheel, dashboard, gear shift, controls, door handle and the like. Clearcoats will typically be applied to the exterior of a vehicle.

The compositions of the present invention are also suitable for use as packaging coatings. The application of various pretreatments and coatings to packaging is well established. Such treatments and/or coatings, for example, can be used in the case of metal cans, wherein the treatment and/or coating is used to retard or inhibit corrosion, provide a decorative coating, provide ease of handling during the manufacturing process, and the like. Coatings can be applied to the interior of such cans to prevent the contents from contacting the metal of the container. Contact between the metal and a food or beverage, for example, can lead to corrosion of a metal container, which can then contaminate the food or beverage. This is particularly true when the contents of the can are acidic in nature. The coatings applied to the interior of metal cans also help prevent corrosion in the headspace of the cans, which is the area between the fill line of the product and the can lid; corrosion in the headspace is particularly problematic with food products having a high salt content. Coatings can also be applied to the exterior of metal cans. Certain coatings of the present invention are particularly applicable for use with coiled metal stock, such as the coiled metal stock from which the ends of cans are made ("can end stock"), and end caps and closures are made ("cap/closure stock"). Since coatings designed for use on can end stock and cap/closure stock are typically applied prior to the piece being cut and stamped out of the coiled metal stock, they are typically flexible and extensible. For example, such stock is typically coated on both sides. Thereafter, the coated metal stock is punched. For can ends, the metal is then scored for the "pop-top" opening and the pop-top ring is then attached with a pin that is separately fabricated. The end is then attached to the can body by an edge rolling process. A similar procedure is done for "easy open" can ends. For easy open can ends, a score substantially around the perimeter of the lid allows for easy opening or removing of the lid from the can, typically by means of a pull tab. For caps and closures, the cap/closure stock is typically coated, such as by roll coating, and the cap or closure stamped out of the stock; it is possible, however, to coat the cap/closure after formation. Coatings for cans subjected to relatively stringent temperature and/or pressure requirements should also be resistant to popping, corrosion, blushing and/or blistering. It has been found that incorporation of the silicone component into a coating as described herein improves flexibility without significantly affecting adhesion; improved food release may also be a benefit of using the coatings of the present invention.

Accordingly, the present invention is further directed to a package coated at least in part with any of the coating compositions described above. A "package" is anything used to contain another item, particularly for shipping from a point of manufacture to a consumer, and for subsequent storage by a consumer. A package will be therefore understood as something that is sealed so as to keep its contents free from deterioration until opened by a consumer. The manufacturer will often identify the length of time during which the food or beverage will be free from spoilage, which typically ranges from several months to years. Thus, the present "package" is distinguished from a storage container or bakeware in which a consumer might make and/or store food; such a container would only maintain the freshness or integrity of the food item for a relatively short period. A package according to the present invention can be made of metal or non-metal, for example, plastic or laminate, and be in any form. An example of a suitable package is a laminate tube. Another example of a suitable package is metal can. The term "metal can" includes any type of metal can, container or any type of receptacle or portion thereof that is sealed by the food/beverage manufacturer to minimize or eliminate spoilage of the contents until such package is opened by the consumer. One example of a metal can is a food can; the term "food can(s)" is used herein to refer to cans, containers or any type of receptacle or portion thereof used to hold any type of food and/or beverage. "Beverage can" may also be used to refer more specifically to a food can in which a beverage is packaged. The term "metal can(s)" specifically includes food cans (including beverage cans) and also specifically includes "can ends" including "E-Z open ends", which are typically stamped from can end stock and used in conjunction with the packaging of food and beverages. The term "metal cans" also specifically includes metal caps and/or closures such as bottle caps, screw top caps and lids of any size, lug caps, and the like. The metal cans can be used to hold other items as well, including, but not limited to, personal care products, bug spray, spray paint, and any other compound suitable for packaging in an aerosol can. The cans can include "two piece cans" and "three-piece cans" as well as drawn and ironed one-piece cans; such one piece cans often find application with aerosol products. Packages coated according to the present invention can also include plastic bottles, plastic tubes, laminates and flexible packaging, such as those made from PE, PP, PET and the like. Such packaging could hold, for example, food, toothpaste, personal care products and the like.

The coating can be applied to the interior and/or the exterior of the package. For example, the coating can be rollcoated onto metal used to make a two-piece food can, a three-piece food can, can end stock and/or cap/closure stock. The coating is applied to a coil or sheet by roll coating; the coating is then cured by radiation and can ends are stamped out and fabricated into the finished product, i.e. can ends. The coating could also be applied as a rim coat to the bottom of the can; such application can be by roll coating. The rim coat functions to reduce friction for improved handling during the continued fabrication and/or processing of the can. The coating can also be applied to caps and/or closures; such application can include, for example, a protective varnish that is applied before and/or after formation of the cap/closure and/or a pigmented enamel post applied to the cap, particularly those having a scored seam at the bottom of the cap. Decorated can stock can also be partially coated externally with the coating described herein, and the decorated, coated can stock used to form various metal cans.

Metal coils, having wide application in many industries, are also substrates that can be coated according to the present invention. Coil coatings also typically comprise a colorant.

After application to the substrate, the coating composition may be cured by any appropriate means. In some applications a cure of 425° F. or lower, such as 415 or lower or 400 or lower for 5 minutes or less, such as 4.5 minutes or less may be desired and can be achieved according to the present invention. In other applications, a longer cure time might be appropriate, such as a cure time of ten to twelve minutes at 380° F. to 425° F. Suitable cure conditions can be determined based on the needs of the user. Accordingly, the present coatings can be used across a broad range of industries and cure conditions.

As used herein, unless otherwise expressly specified, all numbers such as those expressing values, ranges, amounts or percentages may be read as if prefaced by the word "about", even if the term does not expressly appear. Also, any numerical range recited herein is intended to include all sub-ranges subsumed therein. Singular encompasses plural and vice versa. For example, although reference is made herein to "a" silicone component, "a" silicone comprising at least one silicon-bonded hydrogen, "a" silicone comprising at least one ethylenically unsaturated group, "a" film forming component, "a" film forming resin, "a" crosslinker and the like, one or more of each of these and any other components can be used. As used herein, the term "polymer" refers to oligomers and both homopolymers and copolymers, and the prefix "poly" refers to two or more. Including, for example, and like terms means including, for example, but not limited to. When ranges are given, any endpoints of those ranges and/or numbers within those ranges can be combined within the scope of the present invention. The word "comprising" and forms of the word "comprising", as used in this description and in the claims, does not limit the present invention to exclude any variants or additions. Additionally, although the present invention has been described in terms of "comprising", the processes, materials, and coating compositions detailed herein may also be described as "consisting essentially of" or "consisting of".

Non-limiting aspects of the invention include:
1. A coating composition comprising a silicone component comprising:
   a. a silicone comprising at least one silicon-bonded hydrogen and
   b. a silicone comprising at least one ethylenically unsaturated group.
2. The coating composition of Aspect 1, further comprising a hydrosilylation catalyst.
3. The coating composition of Aspect 2, wherein the catalyst comprises a Speier's catalyst.
4. The coating composition of any of the preceding Aspects, wherein the molar ratio of silicon-bonded hydrogens in a:ethylenically unsaturated groups in b is 1.5:1 to 1:1.5.
5. The coating composition of any of the preceding Aspects, wherein a has 2 to 12 silicon-bonded hydrogens
6. The coating composition of any of the preceding Aspects, wherein b has 2 to 12 ethylenically unsaturated groups.
7. The coating composition of any of the preceding Aspects, further comprising a film forming resin component.
8. The coating composition of Aspect 7, wherein the film forming resin component comprises a polyester resin.
9. The coating composition of any of the preceding Aspects, wherein the silicone component comprises 0.01 to 5.0 wt % of the total solid weight of the coating composition.
10. The coating composition of Aspect 9, wherein the silicone component comprises 0.8 to 4.0 wt %, or 1.0 to 3.0 wt % of the total solid weight of the coating composition
11. The coating composition of any of the preceding Aspects, wherein the composition is substantially free of bisphenol A.
12. The coating composition of any of the preceding Aspects, wherein the coating is essentially free of bisphenol A.
13. The coating composition of any of the preceding Aspects, wherein the coating is completely free of bisphenol A.
14. An article coated at least in part with the coating composition of any of Aspects 1-13.
15. A package coated at least in part with the coating composition of any of Aspects 1-13.
16. The package of Aspect 15, wherein the package is a metal can.
17. The package of Aspect 16, wherein the metal can is a food can.
18. The package of any of Aspects 16 or 17, wherein at least a part of the inside of the can is coated.

EXAMPLES

The following examples are intended to illustrate the invention and should not be construed as limiting the invention in any way.

Example 1

A silicone comprising at least one silicon-bonded hydrogen, referred to as Silicone A below, was made by charging the following components to a glass 5 L flask equipped with thermowatch, heating mantle, reflux condenser, stainless steel stirring shaft with stainless steel stirring blade and nitrogen blanket:

28.69 gms hexamethyldisiloxane 106.26 gms 2,4,6,8-tetramethylcylcotetrasiloxane 3365.04 gms octamethylcyclotetrasiloxane 0.5 gms sulfuric acid The flask was heated to 90° C. and held for twelve hours. The catalyst was neutralized by adding an equal molar amount of sodium hydroxide. The resulting silicone polymer was filtered to remove the acid-base salt and vacuum stripped at 150° C. for four hours to remove any remaining cyclical siloxanes.

A silicone comprising at least one ethylenically unsaturated group, referred to as Silicone B below, was made by charging the following components to a glass 5 L flask equipped with thermowatch, heating mantle, reflux condenser, stainless steel stirring shaft with stainless steel stirring blade and nitrogen blanket:

56.55 gms hexamethyldisiloxane
240.18 gms 2,4,6,8-tetramethyl-2,4,6,8-tetravinylcyclotetrasiloxane
3203.27 gms octamethylcyclotetrasiloxane
0.5 gms tetramethylammonium silanolate catalyst The flask was heated to 90° C. and held for twelve hours. The temperature was increased to 150° C. and held for an additional four hours. The product was vacuum stripped at 150° C. for an additional four hours to remove any remaining cyclical siloxanes.

Three coating compositions were made using the ingredients shown in Table 1 below. The components were added in order into a steel mixing vessel under low speed agitation. The components were added slowly to allow for proper dispersion and a suitable solvent was added during the final phase to adjust the viscosity of the coating for application. Coating 1 had no silicone, Coating 2 had both silicone comprising at least one silicon-bonded hydrogen and silicone comprising at least one ethylenically unsaturated group, and Coating 3 had only silicone comprising at least one silicon-bonded hydrogen.

TABLE 1

Coatings 1-3

| Component | Amt | % Composition |
|---|---|---|
| Coating 1 | | |
| Vinyl Copolymer | 39.5 | 44.5 |
| Phenolic A | 6.3 | 7.7 |
| Polyester | 24.8 | 20.3 |
| Phenolic B | 18.8 | 23.9 |
| Benzoguanamine | 1.6 | 1.8 |
| Polyethylene Wax | 0.9 | 1.8 |
| Solvent | 24.3 | 0.0 |
| Total | 116.2 | 100.0 |
| Coating 2 | | |
| Silicone A | 0.25 | 0.50 |
| Silicone B | 0.25 | 0.50 |
| Phenolic A | 6.28 | 7.57 |
| Phenolic B | 18.84 | 23.48 |
| Polyester resin | 80.00 | 64.31 |
| Benzoguanamine | 1.57 | 1.73 |
| Polyethylene Wax | 0.90 | 1.80 |
| Catalyst | 0.10 | 0.10 |
| Solvent | 24.30 | 0.00 |
| Total | 132.48 | 100.00 |
| Coating 3 | | |
| Silicone A | 0.25 | 0.50 |
| Vinyl Copolymer | 0.50 | 0.50 |
| Phenolic A | 6.28 | 7.57 |
| Phenolic B | 18.84 | 23.48 |
| Polyester resin | 80.00 | 64.31 |
| Benzoguanamine resin | 1.57 | 1.73 |
| Polyethylene Wax | 0.90 | 1.80 |
| Catalyst | 0.10 | 0.10 |
| Solvent | 24.30 | 0.00 |
| Total | 132.73 | 100.00 |

The coatings from Table 1 above, were applied on Electroplated tinplate (ETP) and tin-free steel (TFS) with wire wound drawdown bars to obtain a coating thickness of 16-18 mg/4 int. The flat metal panels were then cured in a conventional forced air oven at an optimal temperature of 400 degrees Fahrenheit for 10 minutes. The cured panels were then converted into 307 inch diameter can ends in order to test for flexibility during fabrication. The formed ends were allowed to rest 24 hours before being used in the food media test. Commercially available tomato sauce at a measured pH of 2.8 was used as the test media to determine the adhesion properties and stain resistance of the sample coatings. Test cans were filled with the media and the coated ends were seamed on the test cans. The seamed cans were then steam sterilized at a temperature of 250 degrees Fahrenheit for 30 minutes. Cans were then stored at an elevated temperature for 4 weeks before evaluation. Evaluations were carried out on three ends per coating variable in order to obtain an average rating. The packed and processed ends were tested for adhesion by using Scotch 610 tape that was applied directly to the end and peeled back to determine if there was coating adhesion loss on the metal on a 1-10 scale, 10 meaning zero adhesion loss. The staining was evaluated on a visual scale using photo standards on a 1-10 scale, 10 meaning no stains were visible. As can be seen in Table 2 below, the coating having both silicone comprising at least one silicon-bonded hydrogen and silicone comprising at least one ethylenically unsaturated group had improved adhesion and stain resistance as compared with the coating having no silicone and the coating having only silicone comprising the silicon-bonded hydrogen.

TABLE 2

Coatings 1-3 Results

| | | | Acidified Tomato Sauce (pH - 2.8) | | | |
|---|---|---|---|---|---|---|
| | | | ETP Ends | | TFS Ends | |
| ID | Coating | End# | Adh | Stain | Adh | Stain |
| A | No-Silicone | 1 | 8 | 7 | 7 | 7 |
| | | 2 | 7 | 7 | 8 | 7 |
| | | 3 | 7 | 7 | 7 | 7 |
| | | Average | 7.3 | 7.0 | 7.3 | 7.0 |
| B | Si—H & Si—C=C | 1 | 9 | 8 | 10 | 9 |
| | | 2 | 9 | 9 | 10 | 9 |
| | | 3 | 9 | 9 | 10 | 8 |
| | | Average | 9.0 | 9.0 | 10.0 | 9.0 |
| C | Si—H & Vinyl | 1 | 7 | 6 | 6 | 6 |
| | | 2 | 6 | 5 | 5 | 6 |
| | | 3 | 6 | 7 | 5 | 5 |
| | | Average | 6.3 | 6.0 | 5.3 | 5.7 |

Example 2

Three coating compositions were made using the ingredients shown in Table 3, below, generally following the methods described in Example 1. Coating 4 had no silicone, Coating 5 had 0.5 wt % silicone component and Coating 6 had 1.0 wt % silicone component; wt % was based on the total solid weight of the coating composition. The ratio of silicone comprising at least one silicon-bonded hydrogen to silicone comprising at least one ethylenically unsaturated group was 1:1 for each of Coatings 5 and 6.

TABLE 3

Coatings 4-6

| Component | Amt | % R/S* |
|---|---|---|
| Coating 4 | | |
| Vinyl Copolymer | 39.5 | 44.5 |
| Phenolic A | 6.3 | 7.7 |
| Phenolic B | 18.8 | 23.9 |
| Polyester Resin | 24.8 | 20.3 |
| Benzoguanamine Resin | 1.6 | 1.8 |
| Wax Additive | 0.9 | 1.8 |
| Solvent | 34.3 | 0.0 |
| | 126.2 | 100 |
| Coating 5 | | |
| Vinyl Copolymer | 39.52 | 44.21 |
| Phenolic A | 6.28 | 7.66 |
| Phenolic B | 18.84 | 23.76 |
| Polyester Resin | 24.80 | 20.18 |
| Benzoguanamine Resin | 1.57 | 1.76 |
| Polyethylene Wax | 0.90 | 1.82 |
| Silicone Resin | 0.25 | 0.51 |
| Catalyst | 0.10 | 0.10 |
| Solvent | 34.30 | 0.00 |
| | 126.56 | 100 |
| Coating 6 | | |
| Vinyl Copolymer | 39.52 | 43.99 |
| Phenolic A | 6.28 | 7.62 |
| Phenolic B | 18.84 | 23.64 |
| Polyester Resin | 24.80 | 20.08 |
| Benzoguanamine | 1.57 | 1.75 |
| Polyethylene Wax | 0.90 | 1.81 |
| Catalyst | 0.10 | 0.10 |
| Silicone Resin | 0.50 | 1.01 |
| Solvent | 34.30 | 0.00 |
| | 126.81 | 100 |

*% resin solids

Adhesion and stain resistance was tested as described above. As can be seen in Table 4, below, the coating comprising 0.5 wt % of silicone component (Coating 5) had improved adhesion as compared to the control (Coating 4), and the coating comprising 1.0 wt % (Coating 6) had both improved adhesion and improved stain resistance as compared to the control (Coating 4).

TABLE 4

Coatings 4-6 Results

Acidified Tomato Sauce (pH - 2.8)

| ID | Coating | End# | ETP Ends Adh | ETP Ends Stain | TFS Ends Adh | TFS Ends Stain |
|---|---|---|---|---|---|---|
| A | No-Silicone | 1 | 8 | 7 | 7 | 7 |
| | | 2 | 7 | 7 | 8 | 7 |
| | | 3 | 6 | 6 | 7 | 7 |
| | | Average | 7.0 | 6.7 | 7.3 | 7.0 |
| B | 0.5% Silicone | 1 | 10 | 5 | 10 | 5 |
| | | 2 | 9 | 4 | 10 | 4 |
| | | 3 | 9 | 5 | 10 | 5 |
| | | Average | 9.3 | 4.7 | 10.0 | 4.7 |
| C | 1.0% Silicone | 1 | 9 | 8 | 10 | 9 |
| | | 2 | 9 | 9 | 10 | 9 |
| | | 3 | 10 | 9 | 10 | 8 |
| | | Average | 9.0 | 9.0 | 10.0 | 9.0 |

Whereas particular embodiments of this invention have been described above for purposes of illustration, it will be evident to those skilled in the art that numerous variations of the details of the present invention may be made without departing from the invention as defined in the appended claims.

What is claimed is:

1. A package coated at least in part with a coating composition comprising a silicone component comprising:
    a. a silicone comprising at least one silicon-bonded hydrogen and
    b. a silicone comprising at least one ethylenically unsaturated group.
2. The package of claim 1, wherein the coating composition is essentially free of bisphenol A.
3. The package of claim 1, wherein the coating composition is completely free of bisphenol A.
4. The package of claim 1, wherein the coating composition is substantially free of bisphenol A.
5. The package of claim 1, wherein the package is a metal can.
6. The package of claim 5, wherein the metal can is a food can.
7. The package of claim 1, wherein the coating further comprises a film-forming resin component.
8. The package of claim 7, wherein the film-forming resin component comprises a polyester resin.
9. The package of claim 1, wherein the silicon component comprises 0.01 to 5.0 wt % of the total solid weight of the coating composition.

* * * * *